Dec. 8, 1931.  A. B. CHERNEY  1,835,376
WOOD SAWING MACHINE
Filed April 3, 1930  3 Sheets-Sheet 1
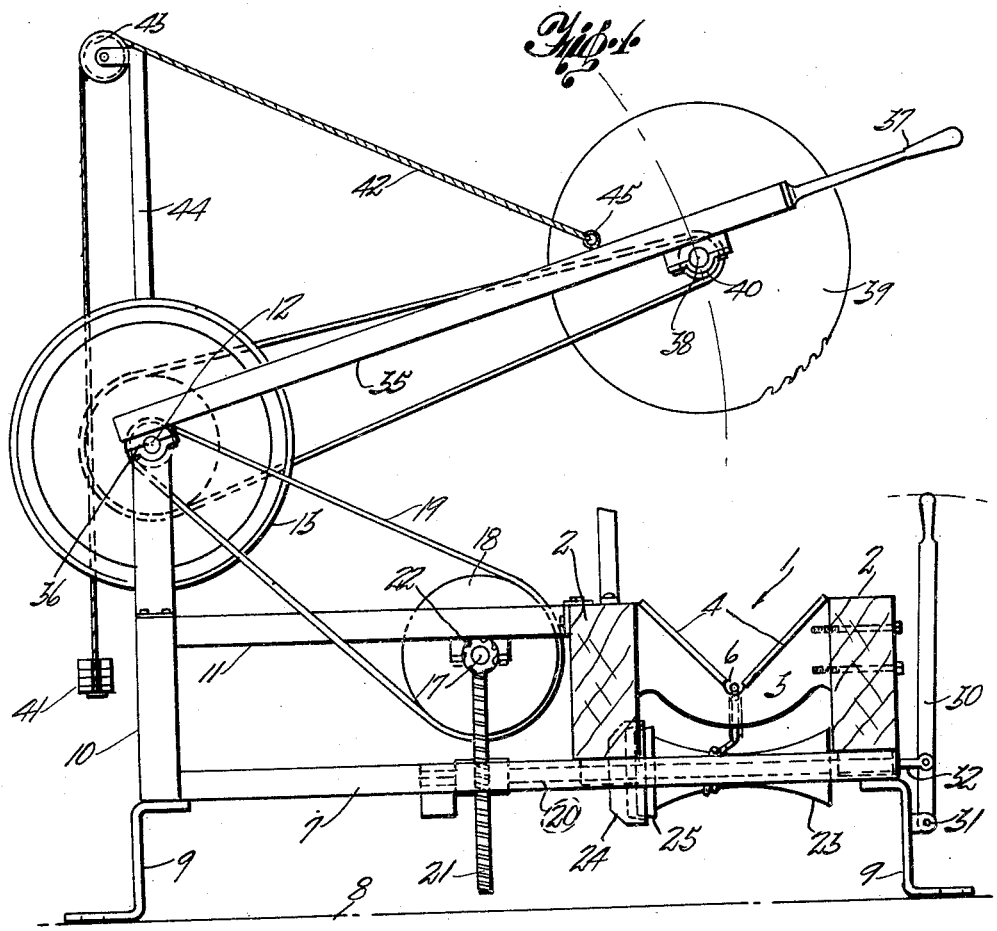
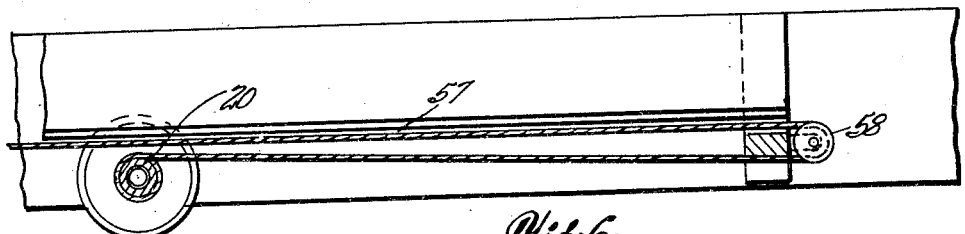
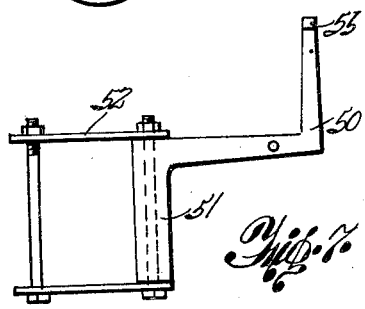
Inventor
Anton B. Cherney
By Adam E. Fisher
Attorney

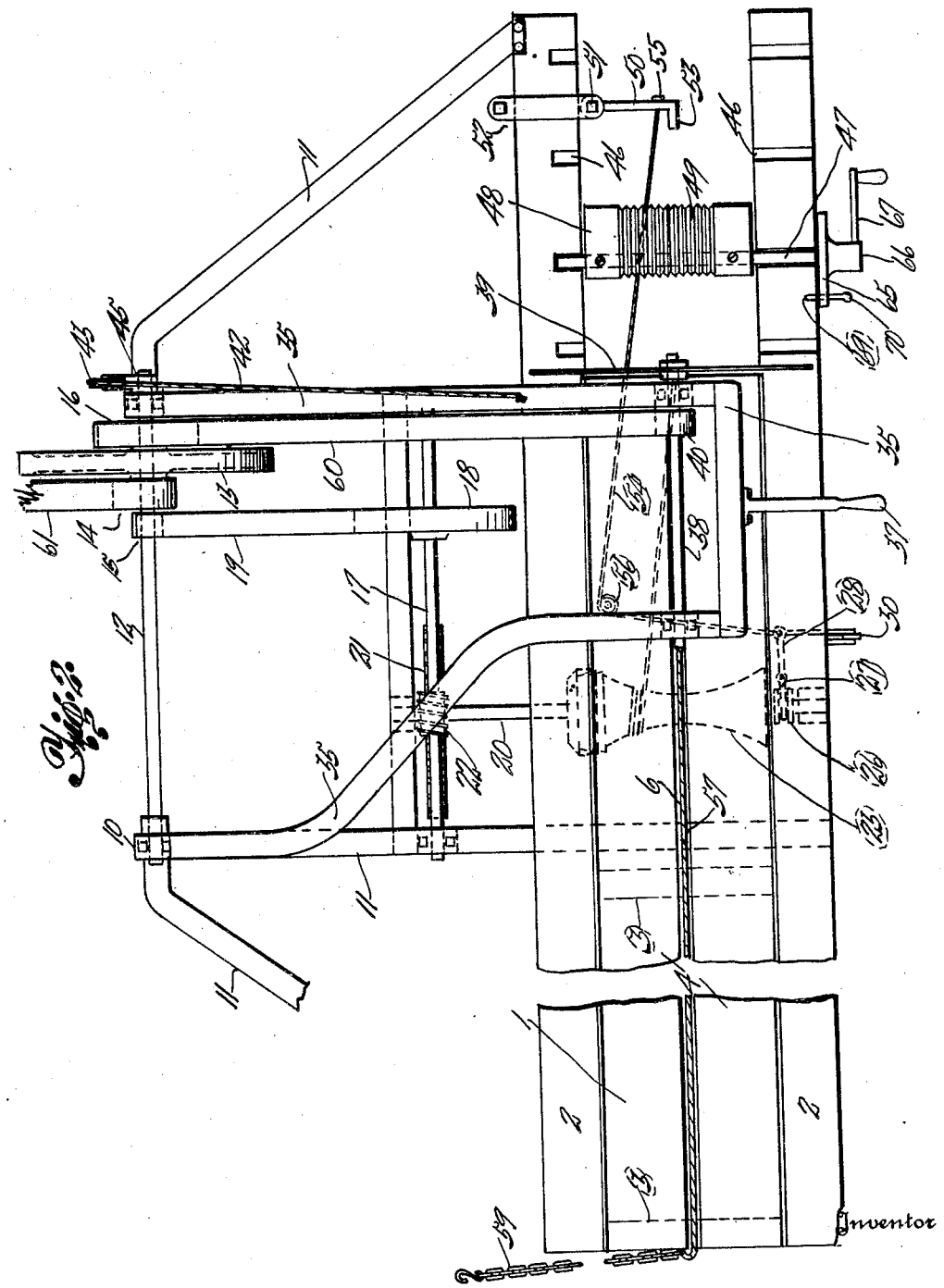

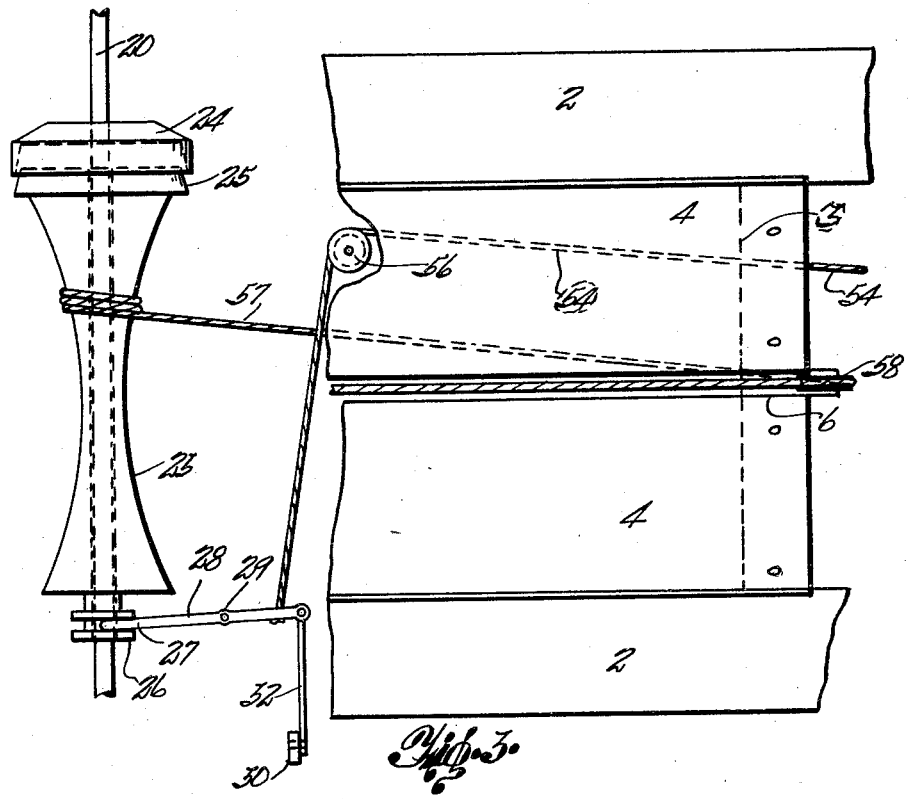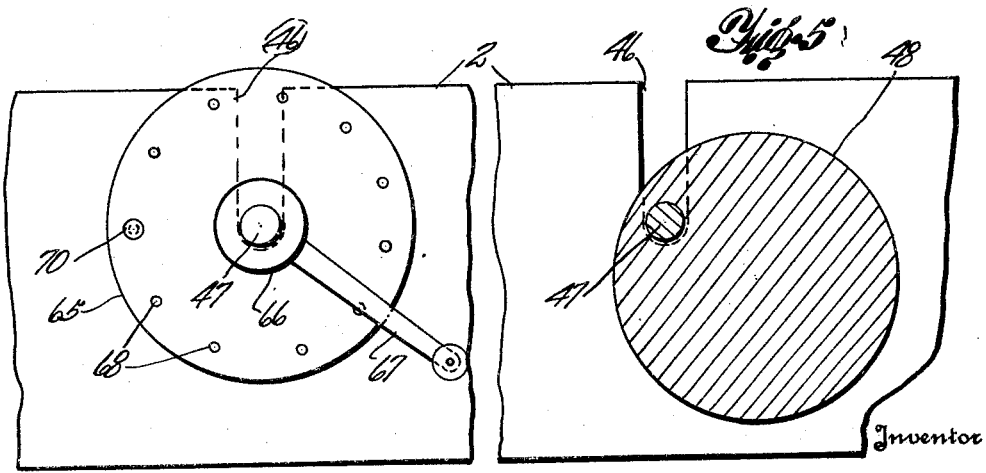

Patented Dec. 8, 1931

1,835,376

UNITED STATES PATENT OFFICE

ANTON B. CHERNEY, OF MILWAUKEE, WISCONSIN

WOOD SAWING MACHINE

Application filed April 3, 1930. Serial No. 441,262.

This invention is a wood sawing machine for sawing up logs and timbers into short lengths.

One object is to provide a practical machine for the purpose stated, comprising relatively few parts and wherein means are provided for feeding a log intermittently and automatically to the saw.

Another object is to provide means, actuated by the same power driving the saw, for propelling the log along its guideways to the saw, the said propelling means being controlled by a clutch normally automatically operated by the progress of the log itself, but being also independently operable through a hand lever.

Another object is to provide at the saw end of the apparatus an adjustable log rest adapted to support and steady that end of the log under the action of the saw even though the log chance to be crooked or bent.

With these and other objects in view as will appear, attention is called to the accompanying drawings, the same constituting a part of this specification, and wherein Figure 1 is an end elevation of the apparatus looking endwise over the same towards saw end;

Figure 2 is a plan view, a medial portion of the log chute being broken away;

Figure 3 is an enlarged detail of the clutch mechanism, portions of the supporting frame being broken away;

Figures 4 and 5 are enlarged details of the adjustable log support;

Figure 6 is an enlarged detail of the log propelling mechanism, portions of the frame being broken away;

Figure 7 is a detail of the automatic clutch operating lever.

The invention comprises a log chute 1 made up of two parallel timbers 2 suitably spaced apart and secured together by cross braces 3, and a V-shaped slideway which includes two guides 4 formed integrally with the cross braces 3 and sloping downwardly and inwardly as shown, there being left at the bottom a narrow clearance 6 between the guides to serve as a cable way. The chute 1 is suitably mounted upon a laterally extended base frame 7 and the chute and frame are secured to the floor 8 or other support by means of a plurality of legs 9 properly spaced and positioned. At the free end of the frame 7 uprights or posts 10 are set up in spaced relation and are reinforced by braces 11 extended across to the adjacent timber 2. Between the upper ends of the posts 10 is journaled a power or drive shaft 12 which carries a fly wheel 13, a power receiving pulley 14, and power delivering pulleys 15 and 16. A countershaft 17 is journaled between the braces 11 and a pulley 18 is mounted thereupon in alignment with the pulley 15, and a belt 19 connects the two. A shaft 20 is journaled underneath the chute 1 transversely under the shaft 17 and a worm gear 21 is rigidly mounted thereon. A worm 22 is rigidly mounted on the shaft 17 in mesh with the gear 21. A spool 23 is loosely mounted upon the shaft 20 under the chute 1. The spider 24 of a cone clutch is rigidly mounted upon the shaft 20 and the complementary cone 25 of the clutch is mounted at the inner end of the spool 23. A double collar 26 at the outer end of the spool 23 and a yoke 27 loosely engaging the same, the said yoke being mounted at the end of the lever 28 pivoted at 29 to the under side of the outer timber 2, provide means for projecting the spool 23 and clutch cone 25 inwardly, and the cone into engagement with the spider 24, whereby the spool 23 is made to rotate with the shaft 20.

A hand lever 30 is pivoted at its lower end to a bracket 31 extended from any convenient point of the structure, and a short arm 32 pivotally connects the said lever with the lever 28. A saw frame 35 has journal bearings 36 upon the shaft 12 and extends over and ends in the handle 37, whereby the entire frame maybe raised or lowered as may be desired. A saw shaft 38 is journaled in the free side of the frame adjacent the handle and carries the rigidly mounted circular saw 39 and the pulley 40 aligned with the pulley 16. The frame 35 is counterbalanced by means of the weight 41 at the end of the cable 42 passed over the pulley 43 at the upper end of the post 44 and secured to the said frame at 45. A number of aligned bearing slots 46 are cut in the timbers 2 at the saw end thereof and adapted to rotatably receive the ends of a shaft 47. An adjustment roller 48 is eccentrically and rigidly mounted upon this shaft and has its periphery serrated or toothed as shown at 49 to prevent logs from rolling or turning when resting thereupon. An automatic clutch operating lever 50 is pivotally mounted at 51 in a bracket 52 adjustably clamped and secured to the inner timber 2, and the lever 50 carries a stop 53 adapted to be struck by a log moving sawward upon the chute 1 as will be described. A clutch cable 54 connects at 55 with the lever 50 and is extended over a pulley 56 supported from any convenient point of the structure and then connects at the other end with the described lever 28. Another cable 57 is fastened at one end to the said spool 23 whence it is trained over a pulley 58 supported at the under side of the saw end of the structure and extended back along the cable way 6. A log chain 59 is connected with the free end of this cable 57. A belt 60 connects the two said pulleys 16 and 40. Power for operating the saw is derived from the belt 61 trained over the pulley 14. A circular plate 65 having a hub 66 and crank 67 is rigidly mounted at the end of the shaft 47 and the peripheral margin of the plate 65 is pierced with a number of spaced holes 68 adapted, upon the rotation of the plate, to successively align themselves with the hole 69 pierced in the outer timber 2. A pin 70 is adapted to be passed through and into the said aligned holes 68 and 69, thus locking the plate 65 and roller 48 against further rotation.

In operation, any log or other timber (not shown) is slid upon the chute 1 between the guides 4 composing the slideway, and the log chain 59 is suitably fastened around the outer end of the log in any conventional manner. Power being turned on through the pulley 14 and the clutch 25 being projected into its spider, the cable 57 winds upon the spool 23, thereby forcing the log saw-ward along the slideway. The frame 35 being elevated by the operator through the handle 37, the log passes under this frame and saw 39. When the end of the log reaches the stop 53, it will strike the same, thereby operating the clutch lever 28 through the cable 54 and thereby disengaging the clutch cone 25 from the spider 24, stopping the rotation of the spool 23 and thereby the further travel of the log. The operator now turns the roller 48 until it has a bearing up under and against the end of the log, thereby supporting the log for the action of the saw. The saw 39 is now lowered upon the end of the log by the operator and a length of the log is thus severed. The operator then throws in the clutch by operating the hand lever 30 and the process is repeated until the log is entirely cut up. It will be understood that by adjusting the bracket 52, the length of the cuts may be varied to suit. Likewise, the roller 48 may be adjusted into any of the aligned slots 46.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a log rest, in combination with a frame including two parallel chute members, the said chute members having a plurality of laterally aligned bearing slots and one of said members having also sockets formed in its outer face adjacent each of the said bearing slots, a shaft adapted for mounting in the bearing slots, a log rest eccentrically secured on the shaft, a circular plate secured to the end of the shaft, a crank on the plate, the said plate having a plurality of spaced apertures adjacent its periphery, and a pin adapted to pass through one of the said apertures in the plate and into one of the said sockets formed in the chute member.

In testimony whereof I affix my signature.

ANTON B. CHERNEY.